(12) United States Patent
Ossimina

(10) Patent No.: US 11,412,718 B2
(45) Date of Patent: Aug. 16, 2022

(54) FISH TANK AIR HOSE CHANNEL APPARATUS

(71) Applicant: Erik Ossimina, Jackson, NJ (US)

(72) Inventor: Erik Ossimina, Jackson, NJ (US)

( * ) Notice: Subject to any disclaimer, the term of this patent is extended or adjusted under 35 U.S.C. 154(b) by 735 days.

(21) Appl. No.: 16/393,142

(22) Filed: Apr. 24, 2019

(65) Prior Publication Data

US 2020/0337278 A1 Oct. 29, 2020

(51) Int. Cl.
- *A01K 63/04* (2006.01)
- *F16L 3/23* (2006.01)
- *F16L 3/26* (2006.01)

(52) U.S. Cl.
CPC .............. *A01K 63/042* (2013.01); *F16L 3/23* (2013.01); *F16L 3/26* (2013.01)

(58) Field of Classification Search
CPC ....... A01K 63/042; A01K 63/006; F16L 3/23; F16L 3/26; A01G 27/005; A01G 27/006
See application file for complete search history.

(56) References Cited

U.S. PATENT DOCUMENTS

| | | |
|---|---|---|
| 3,149,608 A | 9/1964 | Murphy |
| 4,006,711 A | 2/1977 | Frank |
| 4,684,462 A * | 8/1987 | Augustyniak ........ A01K 63/045 119/260 |
| 4,728,420 A | 3/1988 | Abercia, Jr. |
| 5,092,991 A | 3/1992 | Ogawa |
| 5,245,945 A | 9/1993 | Liao |
| 6,840,192 B1 | 1/2005 | Pagano |
| D794,874 S | 8/2017 | Marks |
| 2012/0055413 A1 * | 3/2012 | Kim ..................... A01K 63/006 119/251 |
| 2015/0313191 A1 * | 11/2015 | Snyder ................. A01K 63/003 15/246.5 |
| 2017/0258056 A1 * | 9/2017 | Brown ................. A01K 63/006 |

FOREIGN PATENT DOCUMENTS

KR 101119152 B1 * 3/2022

* cited by examiner

*Primary Examiner* — Timothy D Collins
*Assistant Examiner* — Maria E Graber

(57) ABSTRACT

A fish tank air hose channel apparatus for channeling and hiding air hoses includes a triangular top housing having a hose aperture extending through a pair of back walls. A pair of clips is coupled to the top housing is configured to engage a rim of a fish tank. A top end of a shaft is coupled to a bottom wall of the top housing around a shaft aperture extending therethrough. A bottom end of the shaft is coupled around an entry aperture extending through a rear face of a base. The base has a plurality of exit apertures extending through a front face to the entry aperture. The apparatus is configured to receive a plurality of air hoses fed through the hose aperture, into the shaft aperture, through the shaft, into the entry aperture of the base and out the plurality of exit apertures.

12 Claims, 6 Drawing Sheets

FISH TANK AIR HOSE CHANNEL APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relate to aquarium accessories and more particularly pertains to a new aquarium accessory for channeling and hiding air hoses.

BRIEF SUMMARY OF THE INVENTION

An embodiment of the disclosure meets the needs presented above by generally comprising a top housing having a pair of perpendicular back walls and a front wall extending therebetween. A triangular bottom wall is coupled to the pair of back walls and the front wall. An upper edge of each of the back walls and the front wall forms an open top side to selectively receive a triangular lid. The top housing has a hose aperture extending through the pair of back walls. A pair of clips is coupled to the top housing and comprises a right clip and a left clip coupled to a right back wall and a left back wall of the pair of back walls, respectively. Each of the pair of clips is configured to engage a rim of a fish tank. A shaft is coupled to the top housing. A top end of the shaft is coupled to the bottom wall around a shaft aperture extending therethrough. A base is coupled to the shaft. A bottom end of the shaft is coupled around an entry aperture extending through a rear face of the base. The base has a plurality of exit apertures extending through a front face to the entry aperture. The base is configured to sit adjacent a tank bottom buried beneath a gravel layer of the fish tank. The apparatus is configured to receive a plurality of air hoses fed through the hose aperture, into the shaft aperture, through the shaft, into the entry aperture of the base and out the plurality of exit apertures.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
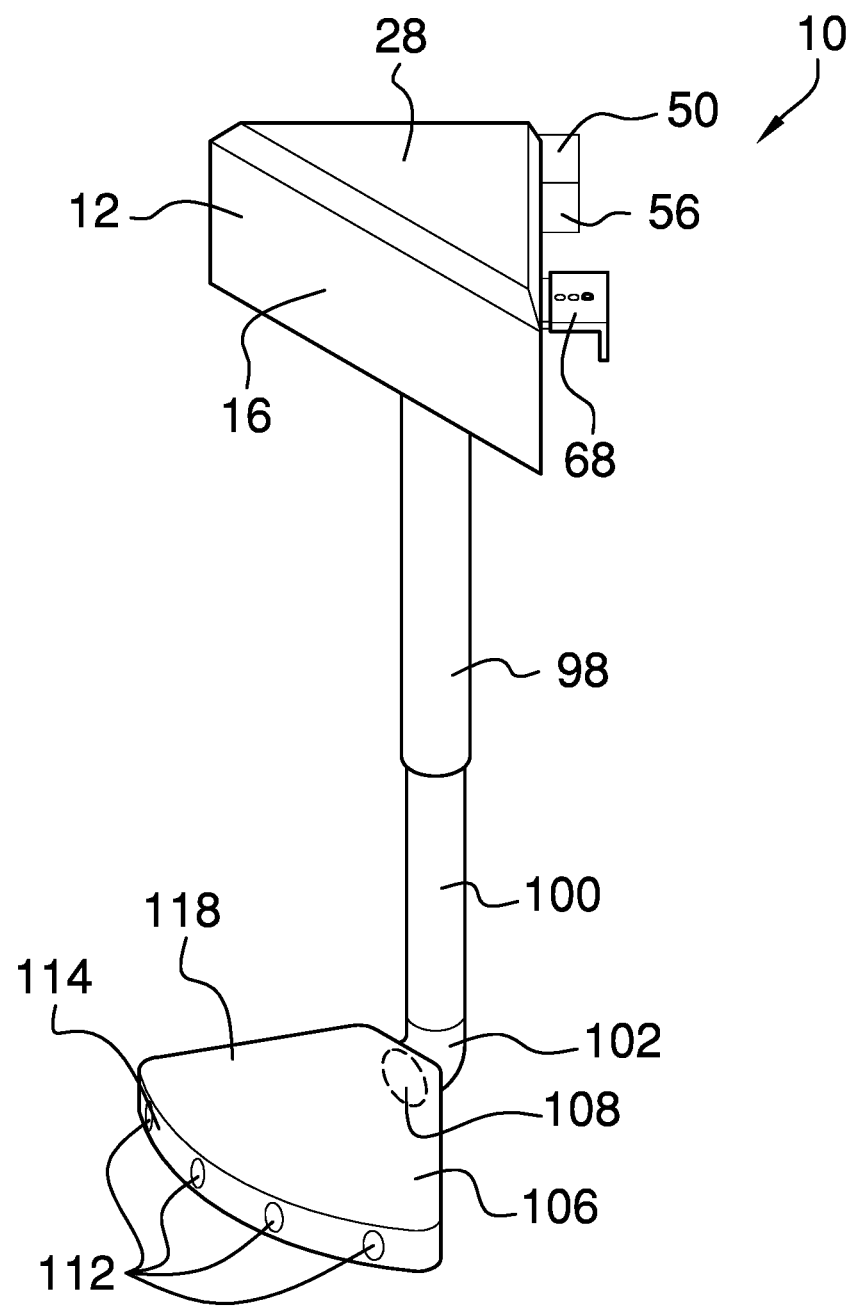
FIG. 1 is an isometric view of a fish tank air hose channel apparatus according to an embodiment of the disclosure.
Figure 2:
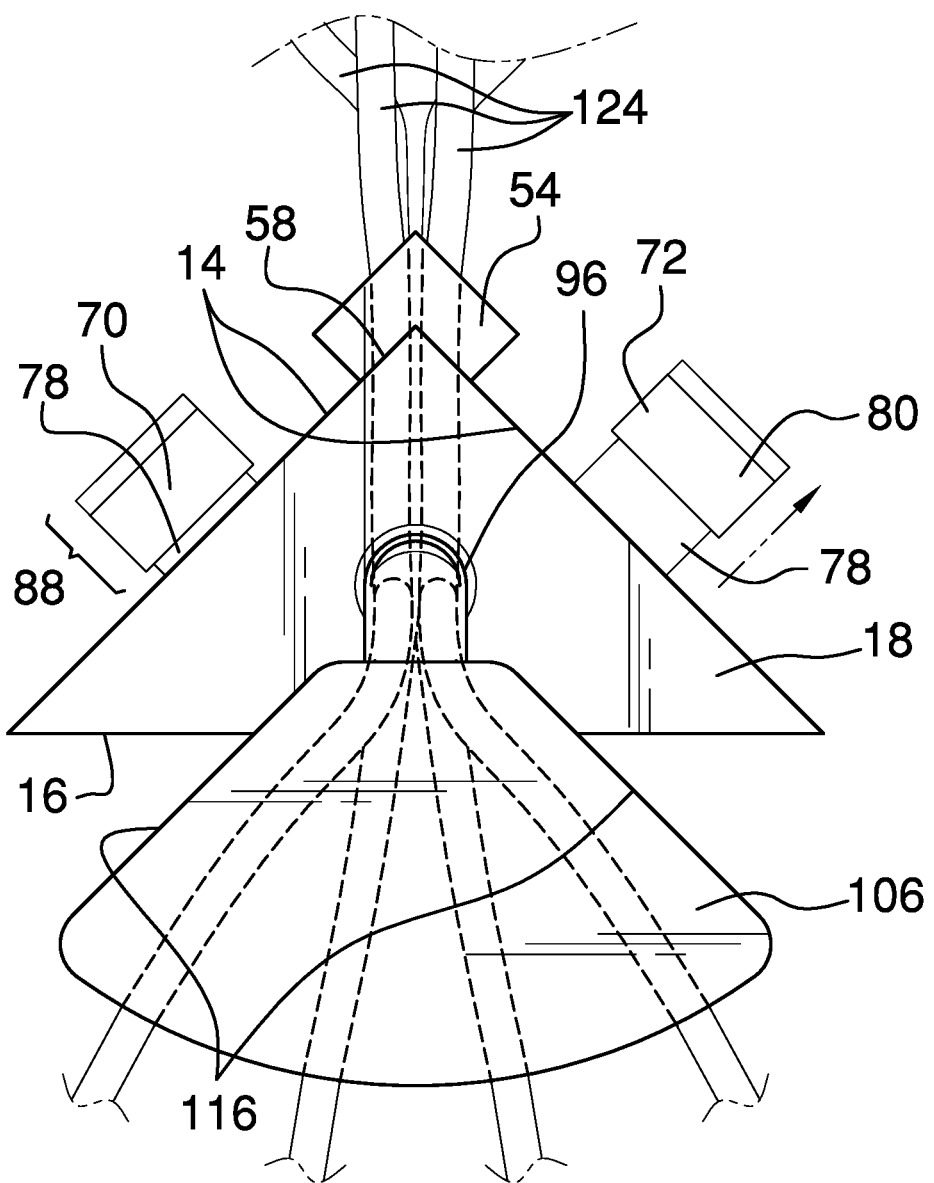
FIG. 2 is a bottom plan view of an embodiment of the disclosure.
Figure 3:
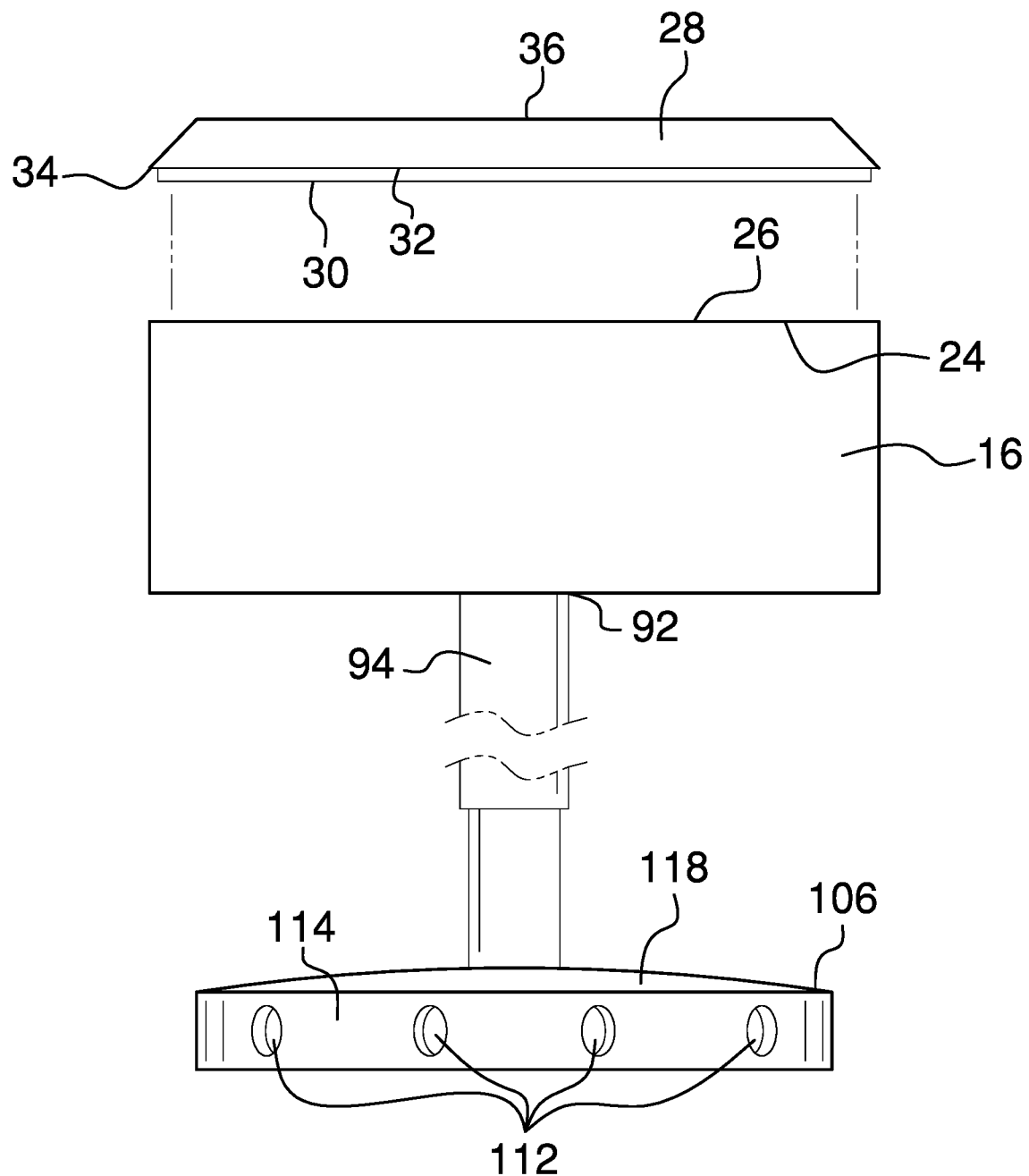
FIG. 3 is a front elevation view of an embodiment of the disclosure.
Figure 4:
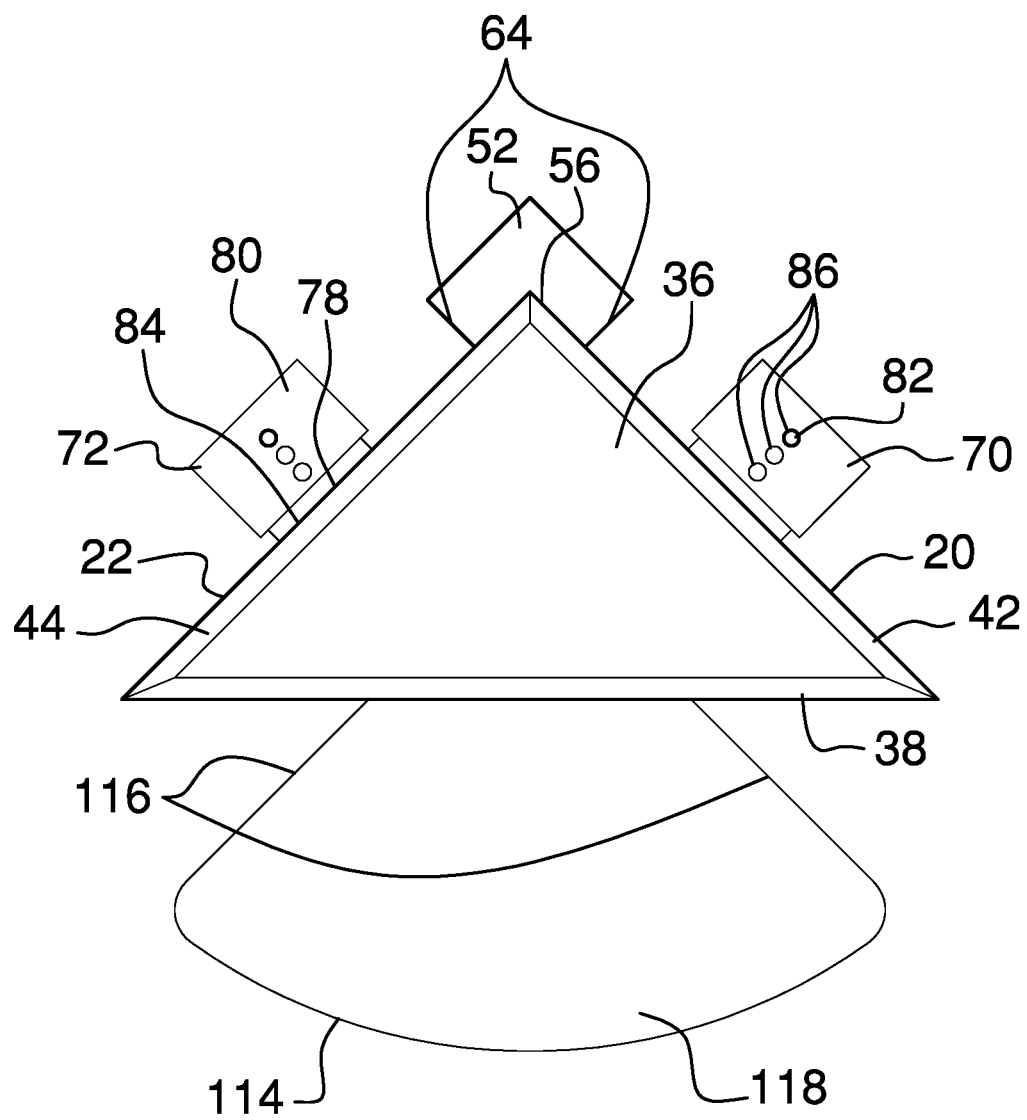
FIG. 4 is a top plan view of an embodiment of the disclosure.
Figure 5:
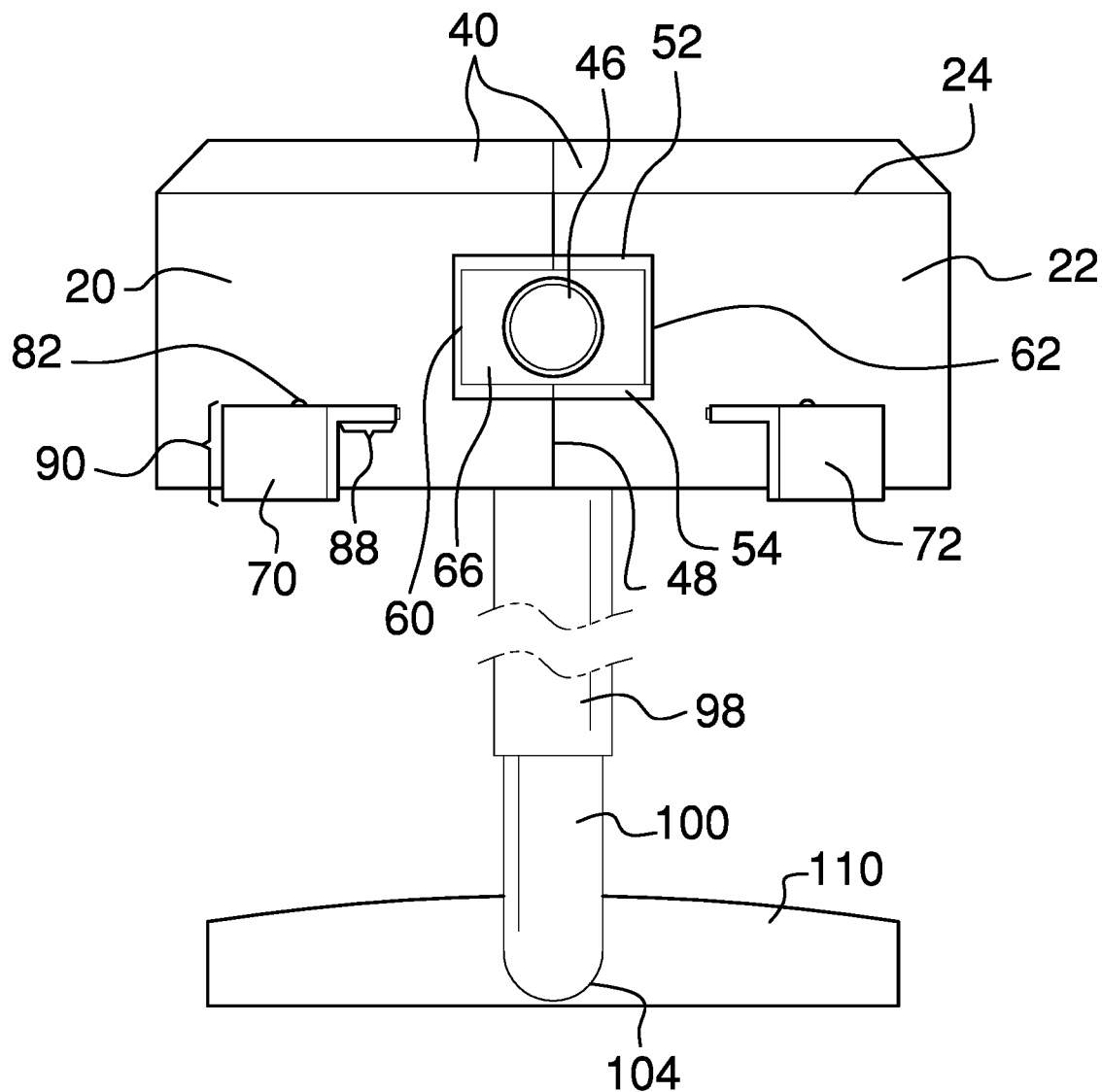
FIG. 5 is a rear elevation view of an embodiment of the disclosure.
Figure 6:
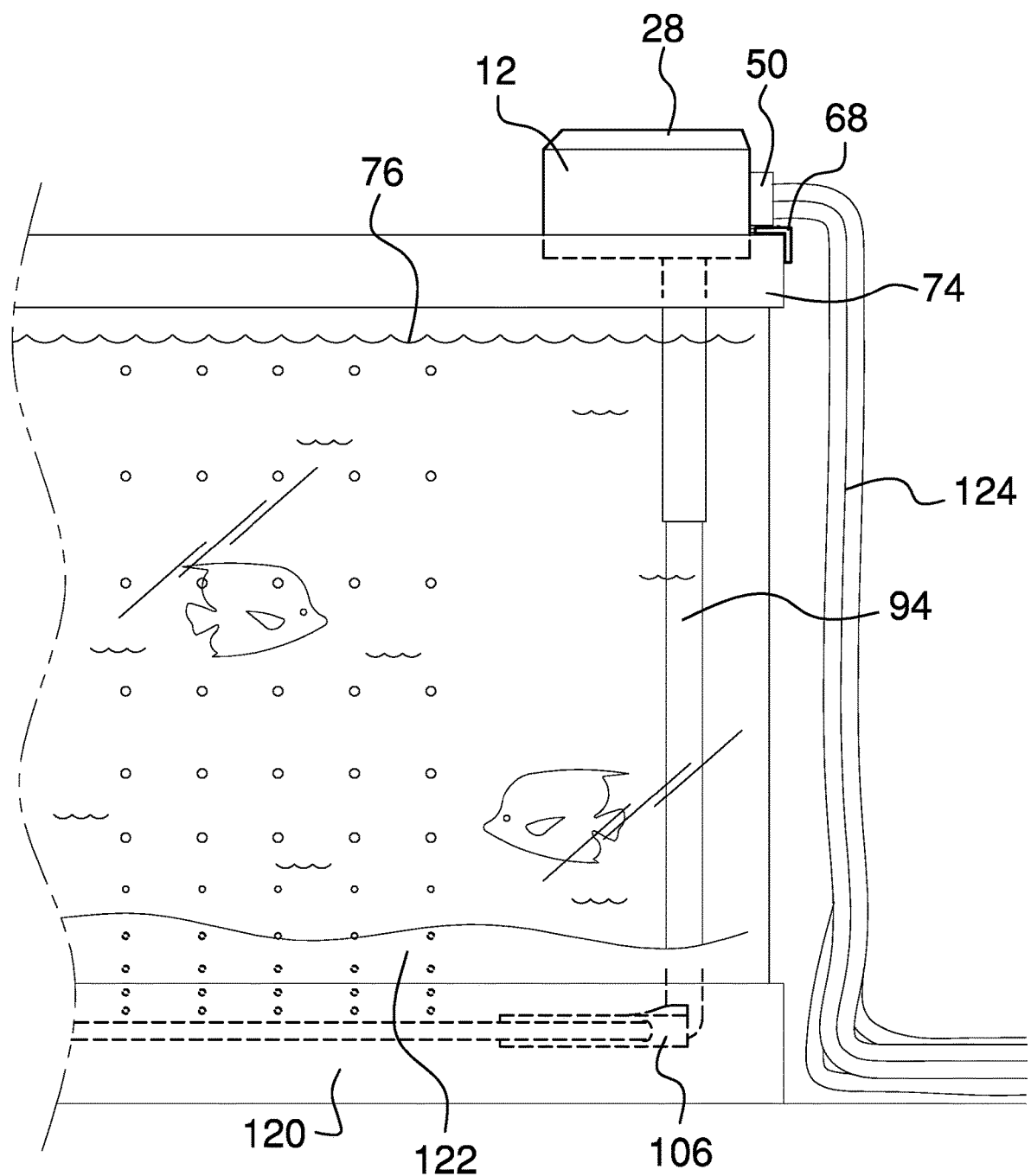
FIG. 6 is an in-use view of an embodiment of the disclosure.

With reference now to the drawings, and in particular to FIGS. 1 through 6 thereof, a new aquarium accessory embodying the principles and concepts of an embodiment of the disclosure and generally designated by the reference numeral 10 will be described.

As best illustrated in FIGS. 1 through 6, the fish tank air hose channel apparatus 10 generally comprises a top housing 12 having a pair of perpendicular back walls 14 and a front wall 16 extending therebetween. A triangular bottom wall 18 is coupled to a right back wall 20 and a left back wall 22 of the pair of back walls and the front wall 16. Each of the pair of back walls 14 is an equal length making the bottom wall 18 a right isosceles triangle. An upper edge 24 of each of the back walls 14 and the front wall 16 form an open top side 26 selectively receiving a triangular lid 28. The lid has an inner extension 30 perpendicularly extending from an underside 32 thereof and defining a perimeter shelf 34. The inner extension 30 is engageable with the pair of back walls 14 and the front wall 16 such that the perimeter shelf 34 rests on the upper edge 24. A lid top side 36 has a chamfered front edge 38 and a pair of chamfered back edges 40. The chamfered front edge 38 and a chamfered right back edge 42 and a chamfered left back edge 44 of the pair of chamfered back edges may lie in planes forming 45° angles with planes of the front wall 16 and the right back wall 20 and the left back wall 22 of the pair of back walls, respectively. The chamfered front edge 38 and the pair of chamfered back edges 40 serve to break lines to minimize the top housing 12 visually.

The top housing 12 has a hose aperture 46 extending through a rear corner 48 joining the pair of back walls 14. A hose hood 50 is coupled to each of the pair of back walls 14 around the hose aperture 46 and comprises a top hood 52, a bottom hood 54, and a pair of side hoods 56. Each of the top hood 52 and the bottom hood 54 are square and have a notched corner 58 to receive the rear corner 48. A right side hood 60 and a left side hood 62 of the pair of side hoods 56 are coupled to the right back wall 20 and the left back wall 22, respectively, between a pair of proximal edges 64 adjacent the notched corner 58 of each of the top hood 52 and the bottom hood 54. An inner hood face 66 extends between the right side hood 60 and the left side hood 62 and lies in a plane parallel to a plane of the front wall 16. The hose aperture 46 is circular and extends through the inner hood face 66.

A pair of clips 68 is coupled to the top housing 12 and comprises a right clip 70 and a left clip 72 coupled to the right back wall 20 and the left back wall 22, respectively. Each of the pair of clips 68 is configured to engage a rim 74 of a fish tank 76. Each of the pair of clips 68 comprises a clip shelf 78 and a clip bracket 80. Each clip shelf 78 is perpendicularly coupled to the top housing 12 and has an engagement protrusion 82 on an upper face 84 of the clip shelf. The clip bracket 80 is L-shaped and has a plurality of engagement apertures 86 extending through a horizontal portion 88 configured to receive the engagement protrusion 82. The plurality of engagement apertures 86 may be an array of three or more apertures 86. The clip bracket 80 thus engages the clip shelf 78 to put a vertical portion 90 a variable distance from the top housing 12 and is thus configured to accommodate the rim 74 of the fish tank being different thicknesses. The right triangular nature of the top housing 12 allows it to rest as far into a back corner of the fish tank as possible to be the least visibly obtrusive.

A top end 92 of a shaft 94 is coupled to the bottom wall 18 around a shaft aperture 96 extending therethrough. The shaft 94 comprises an upper portion 98 and a lower portion 100. The lower portion 100 is telescopable within the upper portion 98 to adjust a length of the shaft 94 for fish tanks 76 of different depths. The lower portion 100 has a 90° elbow 102 orienting a bottom end 104 in a plane perpendicular with a plane of the top end 92.

A base 106 is coupled to the shaft 94. The bottom end 104 of the shaft is coupled around an entry aperture 108 extending through a rear face 110 of the base. The base 106 has a plurality of exit apertures 112 extending through a front face 114 to the entry aperture 108. The plurality of exit apertures 112 may be an array of four evenly spaced apertures 112. The base 106 has a pair of angled side faces 116 extending between the rear face 110 and the front face 114. The pair of angled side faces 116 lies in perpendicular planes parallel to a pair of perpendicular planes of the pair of back walls 14 with the front face 114 wider than the rear face 110. The front face 114 may be a circular segment and a top face 118 of the base may be rounded. The base 106 is configured to sit adjacent a tank bottom 120 buried beneath a gravel layer 122 of the fish tank.

In use, the apparatus 10 is configured to receive a plurality of air hoses 124 fed through the hose aperture 46, into the shaft aperture 96, through the shaft 94, into the entry aperture 108 of the base and out the plurality of exit apertures 112. The lid 28 may be removed to assist in manipulating the pair of air hoses 124. The pair of clips 68 are adjusted as need and engaged with the rim 74 and the shaft 94 is adjusted to place the base 106 adjacent the tank bottom 120 with the hoses 124 extending to different quadrants of the fish tank 76. The hoses 124 are then connected to an air pump to aerate the fish tank 76.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fish tank air hose channel apparatus comprising:
    a top housing, the top housing having a pair of back walls comprising a right back wall perpendicular to a left back wall and a from wall extending therebetween, a triangular bottom wall being coupled to the pair of back walls and the front wall, an upper edge of each of the back walls and the front wall forming an open top side selectively receiving a triangular lid, the top housing having a hose aperture extending through the pair of back walls;
    a pair of clips coupled to the top housing, the pair of clips comprising a right clip and a left clip coupled to a right back wall and a left back wall of the pair of back walls, respectively, each of the pair of clips being configured to engage a rim of a fish tank;
    a shaft coupled to the top housing, a top end of the shaft being coupled to the bottom wall around a shaft aperture extending therethrough; and
    a base coupled to the shaft, a bottom end of the shaft being coupled around an entry aperture extending through a rear face of the base, the base having a plurality of exit apertures extending through a front face to the entry aperture, the base being configured to sit adjacent a tank bottom buried beneath a gravel layer of the fish tank;
    wherein the apparatus is configured to receive a plurality of air hoses fed through the hose aperture, into the shaft aperture, through the shaft, into the entry aperture of the base and out the plurality of exit apertures.

2. The fish tank air hose channel apparatus of claim 1 further comprising each of the pair of clips comprising a clip shelf and a clip bracket, the clip shelf being perpendicularly coupled to the top housing and having an engagement protrusion on an upper face of the clip shelf, the clip bracket being L-shaped and having a plurality of engagement apertures extending through a horizontal portion configured to receive the engagement protrusion, the clip bracket thus engaging the clip shelf to put a vertical portion a variable distance from the top housing and configured to accommodate the rim of the fish tank being different thicknesses.

3. The fish tank air hose channel apparatus of claim 1 further comprising the shaft comprising an upper portion and a lower portion, the lower portion being telescopable within the upper portion, the tower portion having a 90° elbow orienting the bottom end in a plane perpendicular with a plane of the top end.

4. The fish tank air hose channel apparatus of claim 1 further comprising the lid having an inner extension perpendicularly extending from an underside thereof and defining a perimeter shelf, the inner extension being engageable with the pair of back walls and the front wall such that the perimeter shelf rests on the upper edge.

5. The fish tank air hose channel apparatus of claim 1 further comprising the plurality of exit apertures being an array of four evenly spaced apertures.

6. The fish tank air hose channel apparatus of claim 1 further comprising the hose aperture extending through a rear corner of the top housing joining the pair of back walls, a hose hood being coupled to the top housing, the hose hood being coupled to each of the pair of back walls and comprising a top hood, a bottom hood, and a pair of side hoods, each of the top hood and the bottom hood being a square and having a notched corner, the notched corner receiving the rear corner, a right side hood and a left side hood of the pair of side hoods being coupled to the right back wall and the left back wall, respectively, between a pair of proximal edges adjacent the notched corner of the top hood and the bottom hood.

7. The fish tank air hose channel apparatus of claim 6 further comprising an inner hood face extending between the right side hood and the left side hood and lying in a plane parallel to a plane of the front wall, the hose aperture being circular and extending through the inner hood face.

8. The fish tank air hose channel apparatus of claim 1 further comprising the base having a pair of angled side faces extending between the rear face and the front face, the pair of angled side faces lying in perpendicular planes parallel to a pair of perpendicular planes of the pair of back walls with the front face being wider than the rear face.

9. The fish tank air hose channel apparatus of claim 8 further comprising the front lice being a circular segment and a top face of the base being rounded.

10. The fish tank air hose channel apparatus of claim 1 further comprising a lid top side having a chamfered front edge and a pair of chamfered back edges.

11. The fish tank air hose channel apparatus of claim 10 further comprising the chamfered front edge and a chamfered right back edge and a chamfered left back edge of the pair of chamfered back edges lying in planes forming 45° angles with planes of the front wall and the right back wall and the left back wall of the pair of back walls, respectively.

12. A fish tank air hose channel apparatus comprising:
a top housing, the top housing having a pair of back walls comprising a right back wall perpendicular to a left back wall, and a front wall extending therebetween, a triangular bottom wall being coupled to a right back wall and a left back wall of the pair of back walls and the front wall, an upper edge of each of the back walls and the front wall forming an open top side selectively receiving a triangular lid, the lid having an inner extension perpendicularly extending from an underside thereof and defining a perimeter shelf, the inner extension being engageable with the pair of back walls and the front wall such that the perimeter shelf rests on the upper edge, a lid top side having a chamfered front edge and a pair of chamfered back edges, the chamfered front edge and a chamfered right back edge and a chamfered left back edge of the pair of chamfered back edges lying in planes forming 45° angles with planes of the front wall and the right back wall and the left back wall of the pair of back walls, respectively, the top housing having a hose aperture extending through a rear corner, joining the pair of back walls;
a hose hood being coupled to the top housing, the hose hood being coupled to each of the pair of back walls and comprising a top hood, a bottom hood, and a pair of side hoods, each of the top hood and the bottom hood being a square and having a notched corner, the notched corner receiving the rear corner, a right side hood and a left side hood of the pair of side hoods being coupled to the right back wall and the left back wall, respectively, between a pair of proximal edges adjacent the notched corner of the top hood and the bottom hood, an inner hood face extending between the right side hood and the left side hood and lying in a plane parallel to a plane of the front wall, the hose aperture being circular and extending through the inner hood face,
a pair of clips coupled to the top housing, the pair of clips comprising a right clip and a left clip coupled to the right back wall and the left back wall, respectively, each of the pair of clips being configured to engage a rim of a fish tank, each of the pair of clips comprising a clip shelf and a clip bracket, the clip shelf being perpendicularly coupled to the top housing and having an engagement protrusion on an upper thee of the clip shelf, the clip bracket being L-shaped and having a plurality of engagement apertures extending through a horizontal portion configured to receive the engagement protrusion, the clip bracket thus engaging the clip shelf to put a vertical portion a variable distance from the top housing and configured to accommodate the rim of the fish tank being different thicknesses;
a shaft coupled to the top housing, a top end of the shaft being coupled to the bottom wall around a shaft aperture extending therethrough, the shaft comprising an upper portion and a lower portion, the lower portion being telescopable within the upper portion, the lower portion having a 90° elbow orienting a bottom end in a plane perpendicular with a plane of the top end; and
a base coupled to the shaft, the bottom end of the shaft being coupled around an entry aperture extending through a rear face of the base, the base having a plurality of exit apertures extending through a front face to the entry aperture, the plurality of exit apertures being an array of four evenly spaced apertures, the base having a pair of angled side faces extending between the rear face and the front face, the pair of angled side faces lying in perpendicular planes parallel to a pair of perpendicular planes of the pair of back walls with the front face being wider than the rear face, the front face being a circular segment and a top face of the base being rounded, the base being configured to sit adjacent a tank bottom buried beneath a gravel layer of the fish tank;
wherein the apparatus is configured to receive a plurality of air hoses fed through the hose aperture, into the shaft aperture, through the shaft, into the entry aperture of the base and out the plurality of exit apertures.

* * * * *